United States Patent
Fukumoto et al.

(10) Patent No.: US 6,583,837 B1
(45) Date of Patent: Jun. 24, 2003

(54) LIQUID CRYSTAL DISPLAY DEVICE INCLUDING PIXEL ELECTRODES WITH SLITS AND PROTRUSION BETWEEN COMMON ELECTRODE AND ALIGNMENT FILM

(75) Inventors: Masakazu Fukumoto, Akashi (JP); Masahiro Yoshiga, Kobe (JP); Mark Thomas Johnson, Eindhoven (NL); Johannes Albertus Matthijs Maria Van Haaren, Eindhoven (NL); Dirk Kornelis Gerhardus De Boer, Eindhoven (NL); Jeffrey Alan Chapman, Burgess Hill (GB); Armanda Cinderella Nieuwkerk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/869,537
(22) PCT Filed: Nov. 6, 2000
(86) PCT No.: PCT/EP00/11235
§ 371 (c)(1), (2), (4) Date: Jun. 29, 2001
(87) PCT Pub. No.: WO01/33288
PCT Pub. Date: May 10, 2001

(30) Foreign Application Priority Data

Nov. 5, 1999 (JP) .............................. 11-315316

(51) Int. Cl.[7] .......................... G02F 1/1337; G02F 1/13; G02F 1/1343
(52) U.S. Cl. ............................ 349/129; 349/1; 349/139
(58) Field of Search ............................ 349/1, 129, 128, 349/139, 158

(56) References Cited

U.S. PATENT DOCUMENTS

| 6,285,431 B2 * | 9/2001 | Lyu et al. ................... 349/129 |
| 6,342,938 B1 * | 1/2002 | Song et al. .................. 349/129 |
| 6,342,939 B1 * | 1/2002 | Hirata et al. ................. 349/143 |
| 6,407,791 B1 * | 6/2002 | Suzuki et al. ............... 349/129 |
| 2001/0043305 A1 * | 11/2001 | Ohmuro et al. ............. 349/143 |
| 2002/0033922 A1 * | 3/2002 | Hidehira et al. ............ 349/141 |

FOREIGN PATENT DOCUMENTS

| EP | 0987582 | 3/2000 | ......... G02F/1/1337 |
| EP | 0994379 | 4/2000 | ......... G02F/1/1343 |

* cited by examiner

Primary Examiner—Tarifur R. Chowdhury (57) ABSTRACT

In a vertical aligned LCD the other substrate has further protrusion parts e.g. parallel to the gate buses or source buses, in addition to the protrusion parts parallel to slits of pixel electrodes. By the further protrusion, when a voltage is applied to the liquid crystal layer, it becomes easy to align axes of liquid crystal molecules in one direction, so that transmittivity of light which travels through liquid crystal panel becomes high.

14 Claims, 6 Drawing Sheets

LIQUID CRYSTAL DISPLAY DEVICE INCLUDING PIXEL ELECTRODES WITH SLITS AND PROTRUSION BETWEEN COMMON ELECTRODE AND ALIGNMENT FILM

DETAILED DESCRIPTION OF THE INVENTION

1. Field of the Invention

The present invention relates to a liquid crystal display device comprising a first substrate having a pixel electrode and a first alignment film, and a second substrate having a common electrode and a second alignment film.

2. Prior Art

Recently, as liquid crystal display devices in which a light transmissivity and a viewing angle can effectively be improved, liquid crystal display devices adopting a multiple domain vertical alignment (or SVA; Super Vertical Alignment) method have come into wide use. As an example of such conventional liquid crystal display devices in which the SVA method has been adopted, a liquid crystal display device having a TFT substrate with a TFT (thin film transistor) formed thereon and a color filter substrate with a color filter formed thereon will hereinafter be described.

FIGS. 6 through 9 are schematic explanatory views of a conventional liquid crystal display device adopting the SVA method.

Figure 6A:
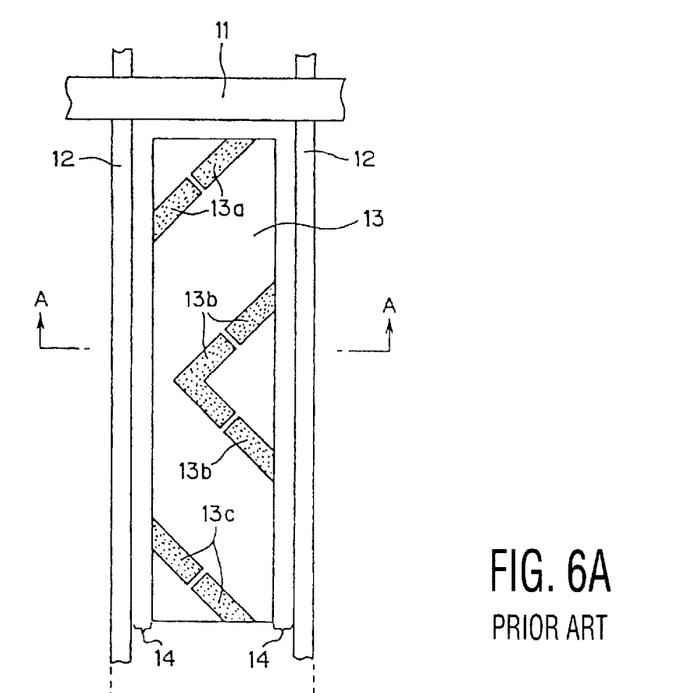
Figure 6B:
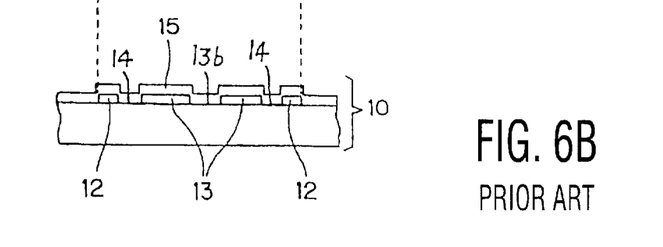

FIG. 6 includes an enlarged plan view (A) of a portion of the TFT substrate in this conventional liquid crystal display device which corresponds to one pixel, and a cross-sectional view (B) of the portion taken along line A—A. FIG. 6(A) shows only a gate bus, source buses and a pixel electrode, and a TFT is omitted from the drawing.

As shown in FIG. 6(A), this TFT substrate 10 is formed with a gate bus 11 and source buses 12. Further, the TFT substrate 10 is formed with a pixel electrode 13 and a TFT (not shown) correspondingly to each pixel. Slits 13b (portions indicated by multiple dots) are formed at the central part of the pixel electrode 13. Further, slits 13a and slits 13c (portions indicated by multiple dots) are formed at the upper and lower portions (in the drawing) of the pixel electrode 13, respectively. Gaps 14 are provided between the source buses 12 and the pixel electrode 13.

As shown in FIG. 6(B), the surface of the TFT substrate 10 is covered with an alignment film 15. This alignment film 15 is omitted in FIG. 6(A). The TFT substrate 10 is opposed to a color filter substrate via a liquid crystal layer.

Figure 7A:
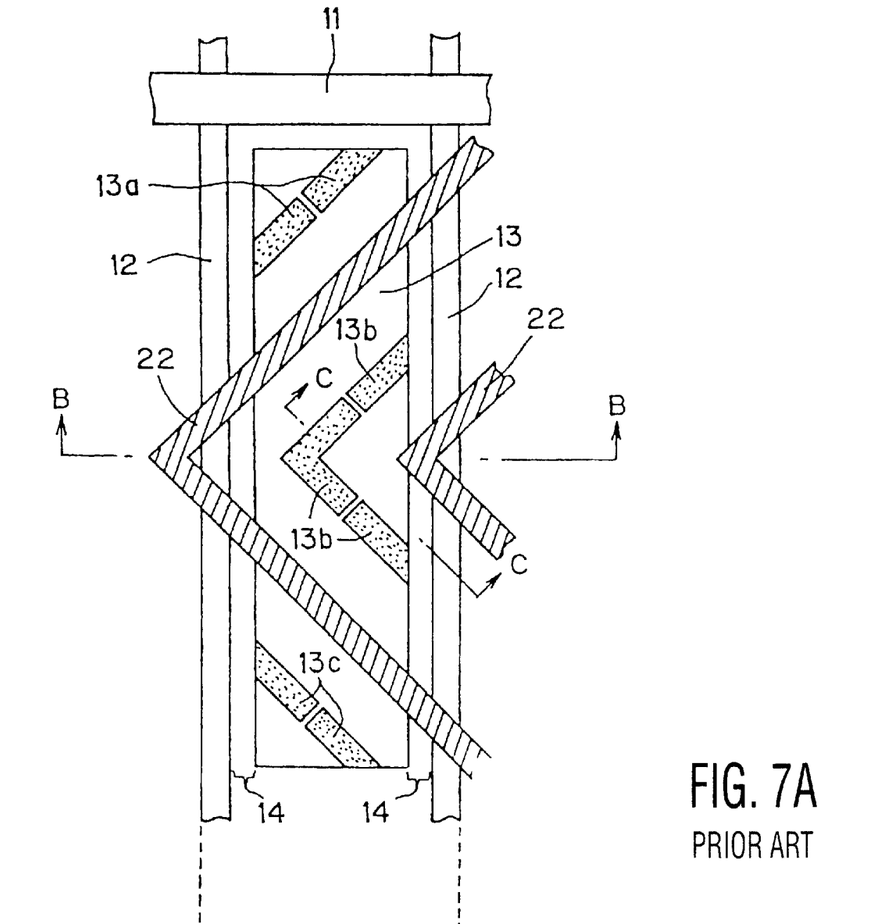
Figure 7B:
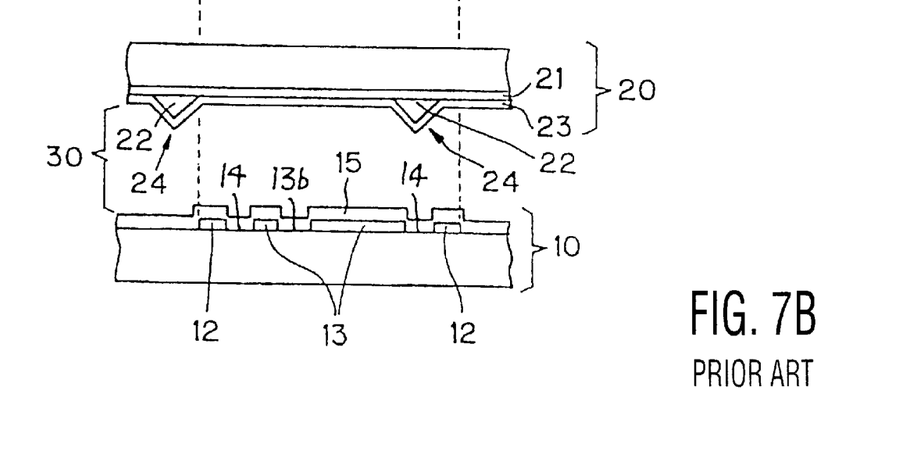

FIG. 7 includes a plan view (A) of the TFT substrate and the color filter substrate opposed to each other via the liquid crystal layer as viewed from the color filter substrate side, and a cross-sectional view (B) of these two substrates taken along line B—B. To illustrate characteristic portions of this conventional liquid crystal display device in a simplified manner, FIG. 7(A) shows only the gate bus, the source buses, the pixel electrode and protrusions (or ridges).

As shown in FIG. 7(B), the TFT substrate 10 is opposed to the color filter substrate 20 via the liquid crystal layer 30. This liquid crystal layer 30 is constituted of negative liquid crystal molecules having properties to be aligned perpendicularly to electric force lines.

The color filter substrate 20 is provided with a color filter (not shown). Further, the color filter substrate 20 is provided with a common electrode 21 on which protrusions (or ridges) 22 are formed. As shown in FIG. 7(A), these projections 22 are formed on the right-hand and left-hand sides of the slits 13b in parallel thereto. A material for these protrusions 22 may be selected, for example, from phenolic resins, novolac resins, and acrylic resins. Further, as shown in FIG. 7(B), the common electrode 21 and the protrusions 22 are covered by an alignment film 23. In this way, protrusions 22 are formed between the common electrode 21 and the alignment film 23, so that the surface of the color filter substrate 20 is formed with portions 24 which are projected toward the liquid crystal layer 30 caused by the protrusions 22. Since the protrusions 22 are formed in parallel to the slits 13b as shown in FIG. 7(A), the projected portions 24 are formed also in parallel to the slits 13b.

The alignment films 15 and 23 formed on the TFT substrate 10 and the color filter substrate 20, respectively, are adapted to align liquid crystal molecules perpendicularly to these alignment films 15 and 23, when no voltage is applied to the liquid crystal layer 30.

Figure 8:
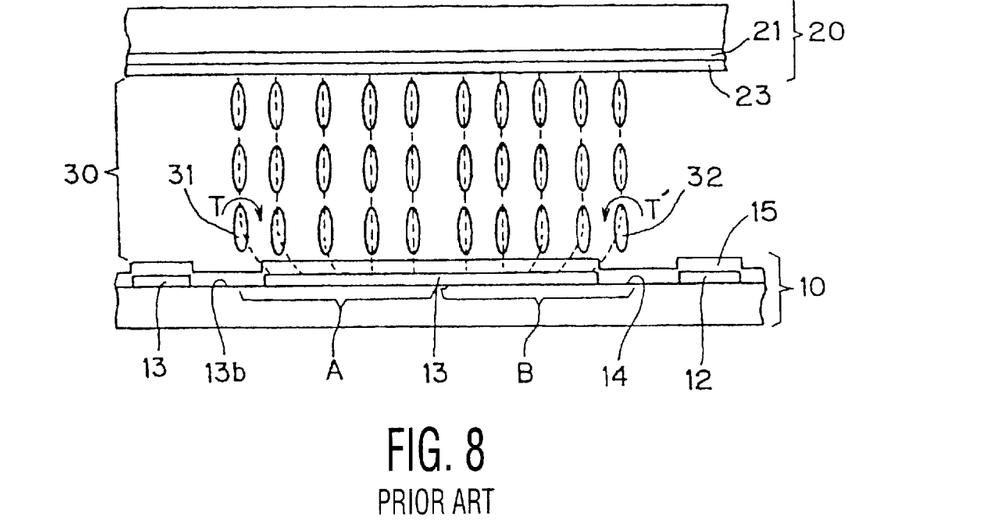
FIG. 8 is a cross-sectional view of the device taken along line C—C of FIG. 7 when no voltage is applied between the substrates 10 and 20.
Figure 9:
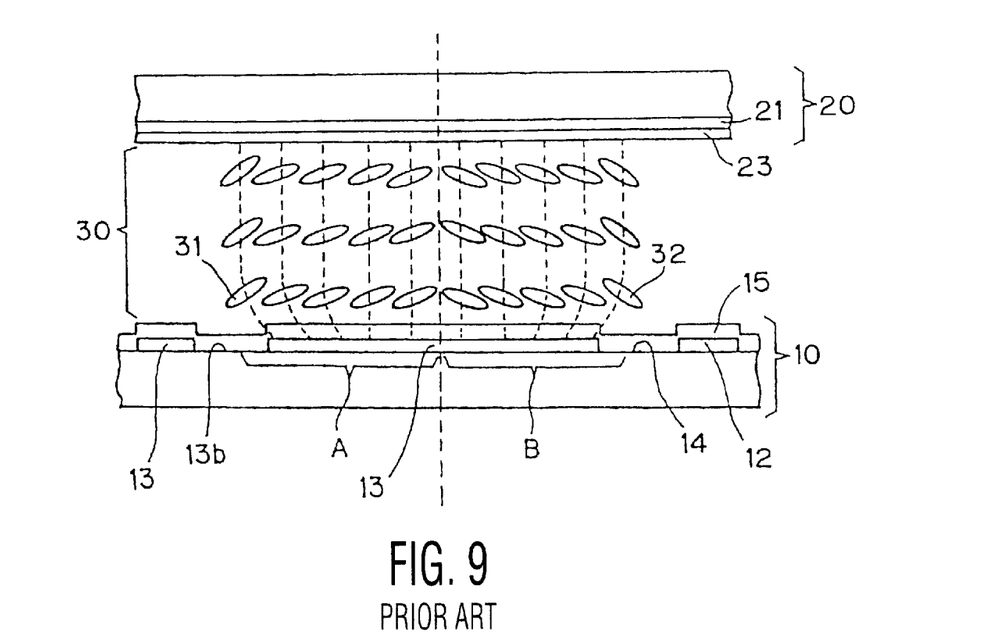
FIG. 9 is a cross-sectional view of the device taken along line C—C of FIG. 7 when a voltage is applied between the substrates 10 and 20.

Description will now be made on the behavior of the liquid crystal molecules when a voltage is applied between the substrates 10 and 20 with reference to FIG. 8 and FIG. 9 showing the liquid crystal molecules more distinctly.

FIG. 8 is a cross-sectional view of the device taken along line C—C when no voltage is applied between the substrates 10 and 20 in FIG. 7, and FIG. 9 is the same cross-sectional view when a voltage is applied between the substrates 10 and 20 in FIG. 7. The liquid crystal molecules are indicated by ellipses.

As shown in FIG. 8, when no voltage is applied (hereinafter referred to as "voltage non-applied period"), the liquid crystal molecules in the liquid crystal layer 30 are oriented perpendicularly to the alignment film 23 (i.e., to each of the substrates 10 and 20). In the state that the liquid crystal molecules are perpendicularly oriented, when a voltage is applied, electric force lines as represented by broken lines develop. As the liquid crystal molecules constituting the liquid crystal layer 30 are negative liquid crystal molecules, they start to be inclined perpendicularly to the electric force lines (horizontally with respect to the substrates 10 and 20). In this case, the electric force lines develop substantially perpendicularly to the substrates 10 and 20. However, as the slits 13b (See FIG. 6) are provided in the pixel electrode 13, and the gap 14 (See FIG. 6) is provided between the pixel electrode 13 and the source bus 12, the electric force lines around the slit 13b and the gap 14 are slightly bent and enter/leave the pixel electrode 13. Accordingly, immediately after the development of these electric force lines, the electric force lines enter/leave those liquid crystal molecules present in positions away from the slit 13b and the gap 14 substantially in parallel thereto, but enter/leave at a slightly inclined angle those liquid crystal molecules present in positions around the slit 13b and the gap 14 under the influence of the slit 13b and the gap 14. Therefore, the liquid crystal molecules 31 and 32 present around the slit 13b and the gap 14 start to be inclined horizontally to the substrates 10 and 20 earlier than the liquid crystal molecules present in the positions away from the slit 13b and the gap 14. When the liquid crystal molecules 31 and 32 start to be inclined, the other liquid crystal molecules sequentially start to be inclined from the liquid crystal molecules 31 and 32 as their starting points. In this case, when considering the directions of the electric force lines that enter/leave the respective liquid crystal molecules 31 and 32, the liquid crystal molecule 31 starts to be oriented perpendicularly to the electric force line while being inclined in the clockwise direction T, whereas the liquid crystal molecule 32 starts to be oriented perpendicularly to the electric force line while being inclined in the counterclockwise direction T'. Accordingly, the liquid crystal molecules positioned in a region A closer to the slit 13*b* than the gap 14 are greatly influenced by the liquid crystal molecule 31 inclined in the clockwise direction T, and sequentially become inclined in the clockwise direction T. On the other hand, the liquid crystal molecules existing in a region B closer to the gap 14 are greatly influenced by the liquid crystal molecule 32 inclined in the counterclockwise direction T', and sequentially become inclined in the counterclockwise direction T'. As a result, during the voltage-applied period, the directions of inclination of the liquid crystal molecules in the regions A and B are opposite to each other, and the liquid crystal molecules are oriented as shown in FIG. 9.

PROBLEMS THAT THE INVENTION IS TO SOLVE

As shown in FIG. 9, when the liquid crystal molecules are inclined in opposite directions in the regions A and B, the boundary between the regions A and B becomes a disclination line, which reduces the light transmittance.

It is therefore an object of the present invention to provide a liquid crystal display device which has an improved light transmissivity of a liquid crystal layer when a voltage is applied.

MEANS FOR SOLVING THE PROBLEMS

To achieve the above object, the liquid crystal display device of the present invention comprises a first substrate having a pixel electrode and a first alignment film, and a second substrate having a common electrode and a second alignment film, the first substrate and the second substrate sandwiching a liquid crystal layer therebetween, and is characterized in that said pixel electrode has at least one first slit, or said first substrate has at least one first protrusion between the pixel electrode and the first alignment film, and in that the common electrode has a second slit extending in a direction different from a direction in which the first slit or the first protrusion extends, or the second substrate has a second protrusion between the common electrode and the second alignment film, the second slit or the second protrusion extending in a direction different from the direction in which the first slit or the first protrusion extends.

In the liquid crystal display device of the present invention, the common electrode has the second slit extending in a direction different from the direction in which the first slit or the first protrusion extends, or the second substrate has the second protrusion between the common electrode and the second alignment film, the second protrusion extending in a direction different from the direction in which the first slit or the first protrusion extends. In this way, the second slit or the second protrusion of the second substrate extends in a direction different from the direction in which the first slit or the first protrusion of the first substrate extends, as a result of which it becomes possible to align the liquid crystal molecules in a desired direction when a voltage is applied to the liquid crystal layer (the manner in which the alignment of liquid crystal molecules is controlled will be described later in detail with reference to some embodiments of the invention). Thus, it becomes possible to control the alignment of the liquid crystal molecules such that the transmissivity of light through the liquid crystal layer is improved when a voltage is applied to the liquid crystal layer.

In the liquid crystal display device of the present invention, it is preferable that the first substrate has a gate bus and a source bus, and that the second slit or the second protrusion (or the first slit or the first protrusion) is parallel to at least one of the gate bus and source bus.

By forming the second slit or the second protrusion in parallel to at least one of the gate bus or the source bus, it becomes possible to control the alignment of the liquid crystal molecules such that the transmissivity of light through the liquid crystal layer is improved when a voltage is applied to the liquid crystal layer.

In the liquid crystal display device of the present invention, it is preferable that the second slit or the second protrusion is formed at a position which opposes a central portion of the pixel electrode.

By forming the second slit or the second protrusion at the position opposing the central portion of the pixel electrode, it also becomes possible to control the alignment of the liquid crystal molecules such that the transmissivity of light through the liquid crystal layer is improved.

BRIEF DESCRIPTION OF THE DRAWINGS

FIG. 1 shows a TFT substrate and a color filter substrate opposed to each other via a liquid crystal layer, wherein 1(A) is a plan view of the substrates viewed from the color filter substrate side, and 1(B) is a cross-sectional view of these two substrates taken along line B—B;

FIG. 6 shows a conventional liquid crystal display device, wherein 6(A) is an enlarged plan view of a portion thereof corresponding to one pixel of a TFT substrate provided in the device and 6(B) is a cross-sectional view of the portion taken along line A—A;

FIG. 7 shows the TFT substrate and the color filter substrate opposed to each other via a liquid crystal layer, wherein 7(A) is a plan view of the substrates as viewed from the color filter substrate side, and 7(B) is a cross-sectional view of these two substrates taken along line B—B;

EMBODIMENTS OF THE INVENTION

Embodiments of the present invention will be described hereinafter.

Figure 1A:
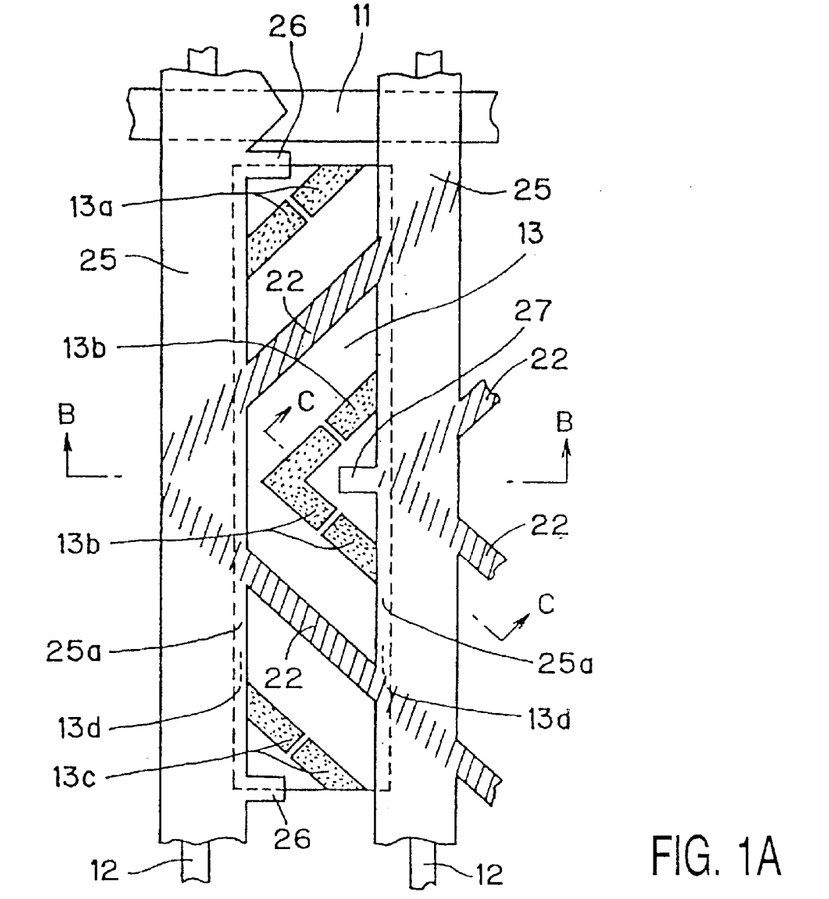
Figure 1B:
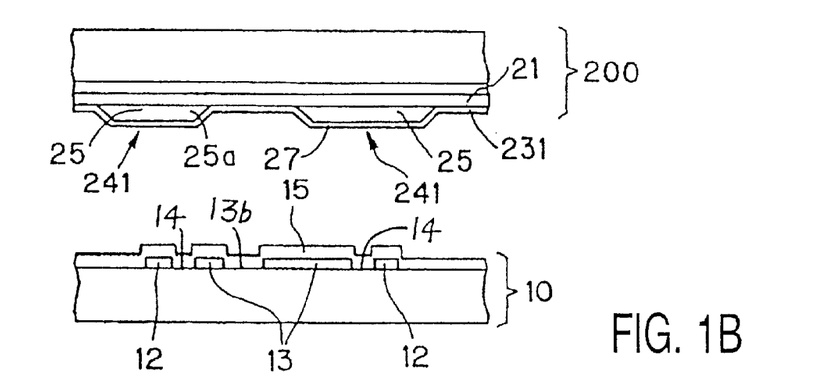
Figure 2:
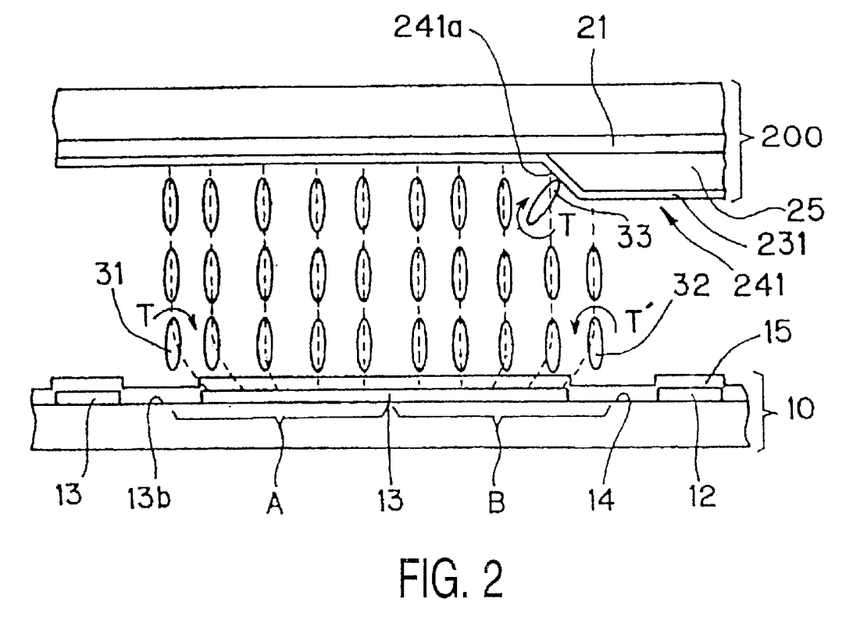
FIG. 2 is an illustration showing the alignment of the liquid crystal molecules during the voltage non-applied period at a cross-section taken along line C—C of FIG. 1.

FIGS. 1 and 2 are schematic explanatory views of a liquid crystal display device according to a first embodiment of the present invention.

FIG. 1 includes a plan view (A) of a TFT substrate and a color filter substrate opposed to each other via a liquid crystal layer viewed from the color filter substrate side, and a cross-sectional view (B) of these two substrates taken along line B—B. In the following description of the liquid crystal panel of FIG. 1, those components identical with those of the liquid crystal panel shown in FIG. 7 are indicated by the same reference numerals, respectively, and only those points different from the liquid crystal panel shown in FIG. 7 will be described.

The difference between FIG. 1 and FIG. 7 is that in FIG. 1, protrusions 25, 26 and 27 are formed, in addition to the protrusion 22 parallel to the slits 13b, on the common electrode 21 of the color filter substrate 200, so that projected portions 241 are formed on the surface of the color filter substrate 200 depending on these protrusions 22, 25, 26 and 27. As in the case of the protrusion 22, phenol resin, novolac resin, acrylic resin or the like can be used as the material of the protrusions 25, 26 and 27. The present invention does not concern the material itself of these protrusions. Each protrusion 25 is formed in parallel to a respective one of the source buses 12 over the entire length thereof. As shown in FIG. 1(A), a side edge portion 25a of the protrusion 25 extents to such an extent that it overlaps with an edge portion 13d of the pixel electrode 13. As shown in FIG. 1(A), each protrusion 26 is formed in parallel to the gate bus 11 over a part of the gate bus 11. Further, the protrusion 27 is formed perpendicularly to the source bus 12 at a position opposite to a central portion of the pixel electrode 13. In the present embodiment, in addition to these protrusions 25, 26 and 27, the protrusions 22 parallel to the slits 13b are also provided as in the case of FIG. 7. These protrusions 22, 25, 26 and 27 are mutually connected into a unitary form. In FIG. 1(A), the portions thereof corresponding to the protrusions 22 formed in parallel to the slit 13b are shown by hatching. Further, an alignment film 231 (See FIG. 1(B)) is formed on the entire surface of the color filter substrate 200 so as to cover the common electrode 21 and the respective protrusions 22, 25, 26 and 27. Since the protrusions 22, 25, 26 and 27 are sandwiched between the common electrode 21 and the alignment film 231, portions 241 projecting toward the liquid crystal layer 30, caused by the respective protrusions 22, 25, 26 and 27, are formed on the surface of the color filter substrate 200, as shown in FIG. 1(B). Note that FIG. 1(B) only shows the projected portions 241 caused by the protrusions 25 and 27 of the protrusions 22, 25, 26 and 27.

The liquid crystal display device of this embodiment can eliminate the disclination, by virtue of the effect of the projected portions 241. The manner in which the disclination is eliminated will be described hereinafter.

Figure 3:
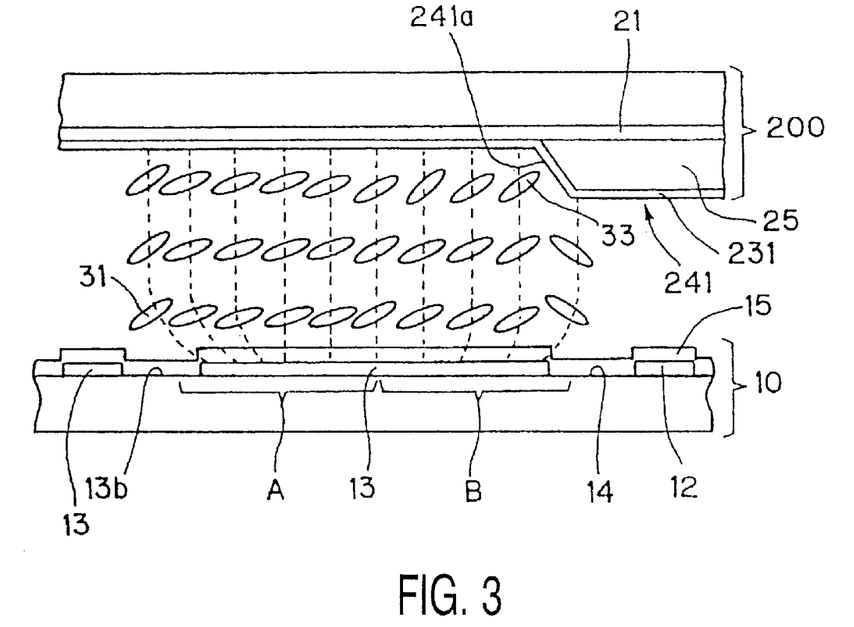
FIG. 3 is an illustration showing the alignment of the liquid crystal molecules during the voltage-applied period at the cross-section taken along line C—C of FIG. 1.

FIG. 2 is a view showing the alignment of the liquid crystal molecules during the voltage non-applied period, at a cross-section taken along line C—C in FIG. 1. FIG. 3 is a view showing the alignment of the liquid crystal molecules during the voltage-applied period, at the same cross-section.

As shown in FIG. 2, during the voltage non-applied period, the liquid crystal molecules are oriented perpendicularly to the surface of the alignment film 231. In the present embodiment, the protrusion 25 is formed in parallel to the source bus 12, as a result of which the projected portion 241 is formed on the color filter substrate 200 in correspondence with the protrusion 25. In this case, the liquid crystal molecule 33 existing around a slope 241a of the projected portion 241 is oriented perpendicularly to the slope 241a, with the result that the liquid crystal molecule 33 is oriented to slightly incline from the vertical direction with respect to the substrates 10 and 200. If a voltage is applied in this situation where the liquid crystal molecules are oriented as above, electric force lines develop as indicated by broken lines. During the voltage non-applied period, as shown in FIG. 2, the liquid crystal molecules existing in positions away from the slope 241a are oriented substantially perpendicularly to the substrates 10 and 200, whereas the liquid crystal molecule 33 present around the slope 241a is slightly inclined. Therefore, immediately after the appearance of the electric force lines, the electric force lines are inclined with respect to the liquid crystal molecule 33 present around the slope 241a as well as the liquid crystal molecules 31 and 32 present around the slit 13b and the gap 14. As a result, when a voltage is applied between the substrates 10 and 200, the liquid crystal molecule 33 existing around the slope 241a in addition to the liquid crystal molecules 31 and 32 starts to be inclined horizontally to the substrates 10 and 200 prior to most of the other liquid crystal molecules. That is, in the present embodiment, a large number of liquid crystal molecules existing between the substrates 10 and 200 start to be inclined horizontally to the substrates 10 and 200 in a chained manner, from the liquid crystal molecule 33 existing around the slope 241a in addition to the liquid crystal molecules 31 and 32, as their starting points. In this case, when considering the electric force lines entering/leaving the liquid crystal molecules 31, 32 and 33, the liquid crystal molecules 31 and 32 existing around the slit 13b and the gap 14 are inclined in the clockwise direction T and the counterclockwise direction T', respectively, and the liquid crystal molecule 33 existing around the slope 241a is inclined in the clockwise direction T. That is, although the liquid crystal molecule 32 near the gap 14 is inclined in the counterclockwise direction T', the liquid crystal molecule 31 existing around the slit 13b and the liquid crystal molecule 33 existing around the slope 241a are both inclined in the clockwise direction T. Accordingly, most of the liquid crystal molecules present in the regions A and B are greatly influenced by the liquid crystal molecules 31 and 33 inclined in the clockwise direction T among the liquid crystal molecules 31, 32 and 33, and sequentially become inclined in the clockwise direction T.

Consequently, most of the liquid crystal molecules present in the regions A and B are oriented in substantially the same direction as shown in FIG. 3. When comparing FIG. 3 with FIG. 9, a disclination is generated on the boundary between the regions A and B in FIG. 9, whereas such disclination has disappeared and the light transmittance has been improved in FIG. 3. In this first embodiment, the light transmittance is increased by about 12% in comparison with the prior art described with reference to FIGS. 6 to 9.

In the first embodiment, the protrusions 22, 25, 26 and 27 are formed in a mutually-connected continuous manner. Thus, the projected portions 241 are also formed in a mutually-connected continuous manner over the whole surface of the color filter substrate 200. However, it is also possible to form the protrusions 22, 25, 26 and 27 physically separately from one another, to thereby form physically separated projected portions 241.

Further, in the first embodiment, the projection 25 parallel to the source bus 12 is formed over the whole length of the source bus 12, so that the projected portion 241 caused by the protrusion 25 is also formed over the whole length of the source bus 12. However, the length of the projected portion 241 may be shorter than that of the source bus 12.

Moreover, in the first embodiment, the protrusions 25 parallel to the source bus 12, the protrusion 26 parallel to the gate bus 11, and the protrusion 27 opposing the central portion of the pixel electrode 13 have been provided so as to form the projected portions 241 on the color filter substrate 20. However, it is not necessary to provide all the three kinds of protrusions 25, 26 and 27, and provision of at least one of the three kinds of protrusions results in formation of a projected portion 241 which is different from the projected portions 24 (see FIG. 7) caused by the protrusions 22 parallel to the slits 13b, whereby an improvement in transmissivity of light may be obtained. Hereinafter, description will be made of another example, as a second embodiment of the liquid crystal display device according to the present invention, provided only with those protrusions 25 of the aforementioned three kinds of protrusions which are parallel to the source bus 12.

Figure 4:
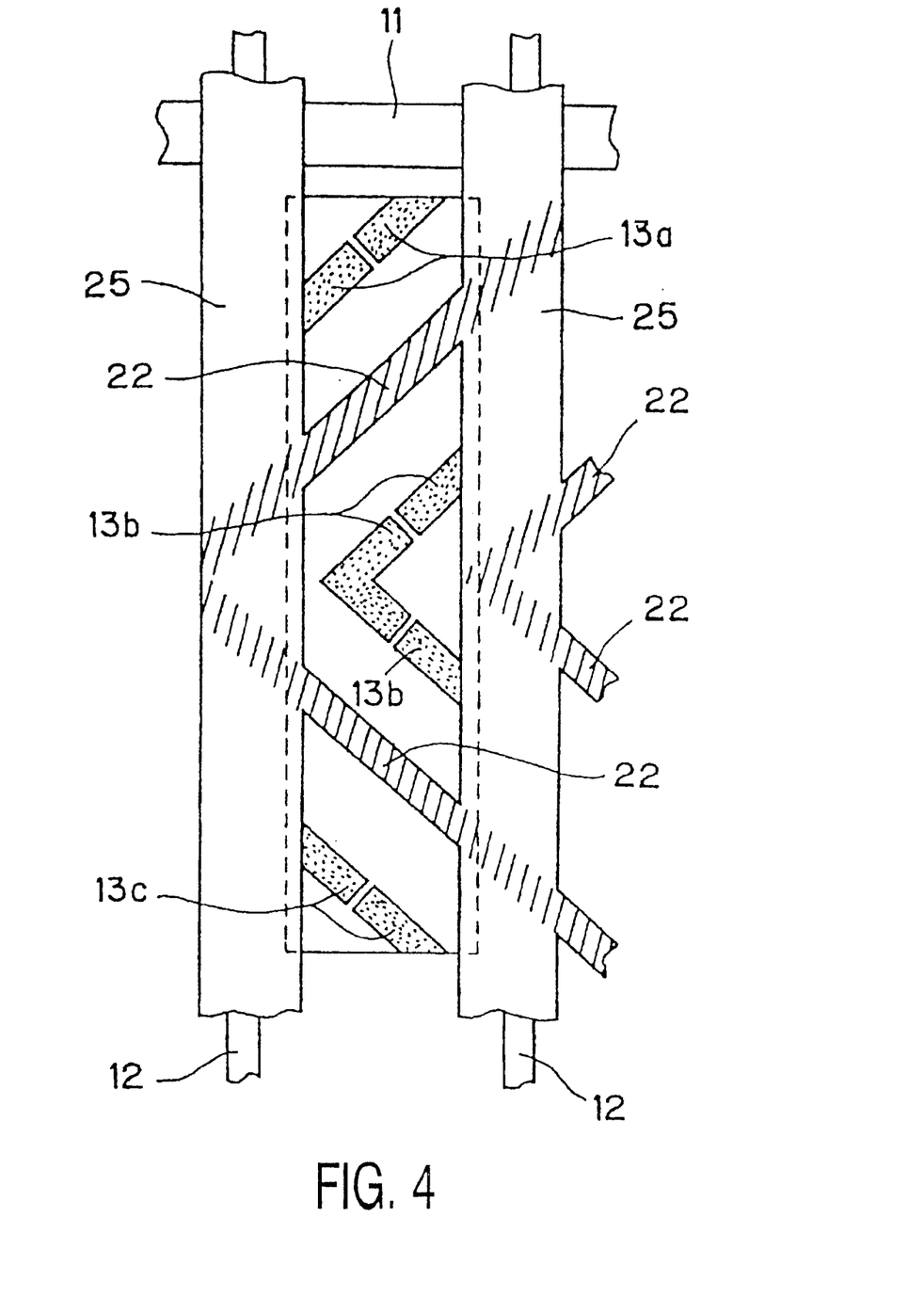
FIG. 4 is a plan view of the device in which only the protrusions 25 parallel to the source buses 12 are provided.

FIG. 4 is a plan view of the device wherein only the protrusions 25 parallel to the source bus 12 are provided. In the following description of the liquid crystal panel of FIG. 4, those components identical with those of the liquid crystal panel shown in FIG. 1 are indicated by the same reference numerals, respectively, and only those points different from the liquid crystal panel shown in FIG. 1 will be described.

The difference between the liquid crystal panel of FIG. 4 and the liquid crystal panel of FIG. 1 is that the liquid crystal panel shown in FIG. 4 is provided only with the protrusions 25 of the protrusions 25, 26 and 27 to form projected portions, whereas the liquid crystal panel shown in FIG. 1 is formed with the protrusion 25 parallel to the source buses 12, the protrusion 26 parallel to the gate bus 11, and protrusion 27 opposing the central portion of the pixel electrode 13, in addition to the protrusions 22 parallel to the slits 13b, so as to form the projected portions 241.

When the projected portions are formed in this way by combining the protrusions 22 parallel to the slits 13b and the protrusions 25 parallel to the source buses 12, the transmissivity of light is increased by about 10% in comparison with the conventional example described with reference to FIGS. 6 through 9.

In the first and second embodiments, the slits 13a, 13b and 13c are provided in each pixel electrode 13 of the TFT substrate 10. However, instead of providing the slits 13a, 13b and 13c in each pixel electrode 13, it is possible to form a flat pixel electrode 13 without slits 13a, 13b and 13c and to provide protrusions between the flatly formed pixel electrode 13 and the alignment film 15. When the protrusions are provided between the pixel electrode 13 and alignment film 15 in this way, the surface of the TFT substrate is formed with portions extending toward the liquid crystal layer 30. Thus, those liquid crystal molecules near these projected portions are inclined with respect to electric force lines similarly to those liquid crystal molecules near the projected portions 241 of the color filter substrate 200, and act as starting points for aligning most of the liquid crystal molecules. Consequently, most of the liquid crystal molecules are aligned in one direction during the voltage-applied period, thereby contributing to an improvement in the light transmissivity. It is also possible to provide protrusions between the pixel electrode 13 and the alignment film 15 and to further provide slits in the pixel electrode 13, to thereby form a combination of the protrusions and the slits. By such combination of the protrusions and the slits, there will also appear liquid crystal molecules inclined with respect to electric force lines, which eventually contribute to the improvement of the light transmissivity. On the other hand it is possible to provide only slits in both the pixel electrodes 13 and the common electrode 21, 212.

In the first and second embodiments described above, the light transmissivity has been improved by providing the color filter substrate 200 with the protrusions 22, 25, 26 and 27. However, it is also possible to improve the light transmissivity by providing the common electrode 21 with slits, instead of providing the protrusions 22, 25, 26 and 27. Hereinafter, description will be made on another example in which the common electrode is provided with slits, as a third embodiment of the present invention.

Figure 5:
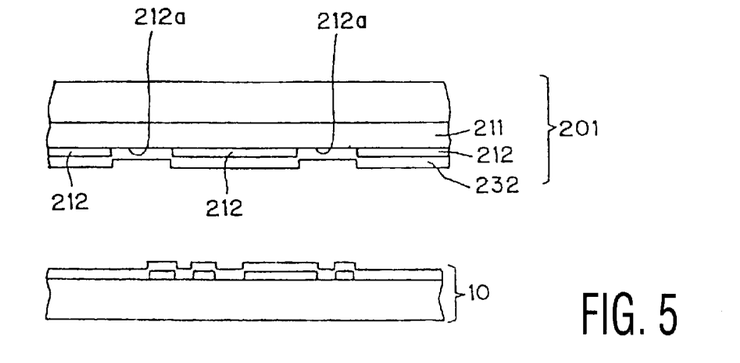
FIG. 5 is a view schematically showing a cross section of a liquid crystal display device having a common electrode provided with slits.

FIG. 5 is a view schematically showing a cross section of a liquid crystal display device having a common electrode provided with slits.

A color filter substrate 201 is provided with a layer 211 comprising a black matrix and colored layers of RGB, and a common electrode 212 having slits 212a is formed on the layer 211. Further, the color filter substrate 201 is formed with an alignment film 232 so as to cover the common electrode 212 having the slits 212a.

By providing the common electrode 212 with the slits 212a in this way, the electric force lines near the slits 212a are slightly bent, and enter or exit from the common electrode 212. Thus, similarly to the electric force lines near the slits (see FIG. 2) provided in the pixel electrode 13 of the TFT substrate, the electric force lines near the slits 212a obliquely enter or exit from the liquid crystal molecules. That is to say, the liquid crystal molecules near the slits 212a become starting points for aligning other liquid crystal molecules. As a result, during the voltage-applied period, most of the liquid crystal molecules are aligned in one direction, thereby eventually contributing to improving the light transmissivity.

Description has been made on examples where the color filter substrate is provided with protrusions with reference to the first and second embodiments and on an example in which the common electrode on the color filter substrate is provided with slits with reference to the third embodiment. However, it is possible to provide the color filter substrate with protrusions and to further provide the common electrode with slits, to thereby from combination of the protrusions with the slits.

In the above description, examples in which a combination of a TFT substrate and a color filter substrate is used as substrates sandwiching a liquid crystal layer therebetween have been taken. However, the combination is not limited to that of a TFT substrate and a color filter substrate, and may be one in which an MIM (Metal Insulator Metal) substrate formed with MIM elements is combined with a color filter substrate.

Advantageous Effects of the Invention.

As described above, according to the liquid crystal display device of the present invention, the transmissivity of light through the liquid crystal layer during the application of a voltage thereto can be improved.

DESCRIPTION OF REFERENCE NUMERALS

| | |
|---|---|
| 10 | TFT substrate |
| 11 | gate bus |
| 12 | source bus |
| 13 | pixel electrode |
| 13a, 13b, 13c, 212a | slit |
| 14 | gap |
| 15, 23, 231, 232 | alignment layer |
| 20, 200, 201 | color filter substrate |
| 21, 212 | common electrode |
| 22, 25, 26, 27 | protrusion |
| 24, 241 | projected portion |
| 30 | liquid crystal layer |

-continued

| 31, 32, 33 | liquid crystal molecule |
| 241a | slope |

What is claimed is:

1. A liquid crystal display device, comprising:
a first substrate having a pixel electrode and a first alignment film, wherein at least one of a first condition and a second condition must be satisfied, wherein the first condition is that the pixel electrode has at least one first slit, and wherein the second condition is that the first substrate has at least one first protrusion between the pixel electrode and the first alignment film; and
a second substrate having a common electrode and a second alignment film, wherein the first substrate and the second substrate are sandwiching a liquid crystal layer therebetween, wherein the second substrate has at least one second protrusion between the common electrode and the second alignment film, wherein a protrusion of the at least one second protrusion extends in a direction different from the direction in which a slit of the at least one first slit extends or from the direction in which a protrusion of the at least one first protrusion extends, wherein the at least one second protrusion includes a protrusion P that has an side edge portion and a remaining portion, and wherein an edge portion of the pixel electrode overlaps with the side edge portion of the protrusion P and does not overlap with the remaining portion of the protrusion P.

2. The liquid crystal display device of claim 1, wherein the pixel electrode has said at least one first slit, and wherein the first substrate does not have said at least one first protrusion.

3. The liquid crystal display device of claim 1, wherein the pixel electrode does not have said at least one first slit, and wherein the first substrate has said at least one first protrusion.

4. The liquid crystal display device of claim 1, wherein the pixel electrode has said at least one first slit, and wherein the first substrate has said at least one first protrusion.

5. liquid crystal display device of claim 1, wherein the first substrate has a gate bus and a source bus, wherein the at least one second protrusion further includes a protrusion $P_1$ and a protrusion $P_2$, wherein the protrusion $P_1$ is parallel to the source bus, and wherein the protrusion $P_2$ is parallel to the gate bus.

6. The liquid crystal display device of claim 5, wherein the at least one second protrusion further includes a protrusion $P_3$ that opposes a central portion of the pixel electrode, and wherein the protrusion $P_3$ is perpendicular to the source bus.

7. The liquid crystal display device of claim 6, wherein the common electrode has at least one second slit, and wherein the at least one second protrusion further includes a protrusion $P_4$ that is parallel to a slit of the at least one second slit.

8. The liquid crystal display device of claim 7, wherein the protrusions $P_1$, $P_2$, $P_3$, and $P_4$ are connected in a mutually-connected continuous manner.

9. The liquid crystal display device of claim 7, wherein the protrusions $P_1$, $P_2$, $P_3$, and $P_4$ are not connected in a mutually-connected continuous manner and are physically separated from one another.

10. The liquid crystal display device of claim 5, wherein the protrusion $P_1$ projects onto the whole length of the source bus.

11. The liquid crystal display device of claim 5, wherein the protrusion $P_1$ projects onto less than the whole length of the source bus.

12. The liquid crystal display device of claim 1, wherein the common electrode has at least one second slit, and wherein the at least one second protrusion further includes a protrusion $P_4$ that is parallel to a slit of the at least one second slit.

13. The liquid crystal display device of claim 1, wherein the common electrode has at least one second slit, and wherein at least one second slit includes a slit $S_1$ and a slit $S_2$, and wherein $S_1$ is parallel to $S_2$.

14. The liquid crystal display device of claim 1, wherein the common electrode has at least one second slit, and wherein at least one second slit includes a slit $S_1$ and a slit $S_2$, and wherein $S_1$ is not parallel to $S_2$.

* * * * *